Jan. 14, 1947. A. T. O'NEIL 2,414,387
PIVOTED BENDER WITH PIVOTED WORK ENGAGING DOG
Filed Feb. 17, 1945 2 Sheets-Sheet 1

Inventor
Albert T. O'Neil
By Caswell & Lagaard
Attorneys

Jan. 14, 1947.  A. T. O'NEIL  2,414,387
PIVOTED BENDER WITH PIVOTED WORK ENGAGING DOG
Filed Feb. 17, 1945  2 Sheets-Sheet 2
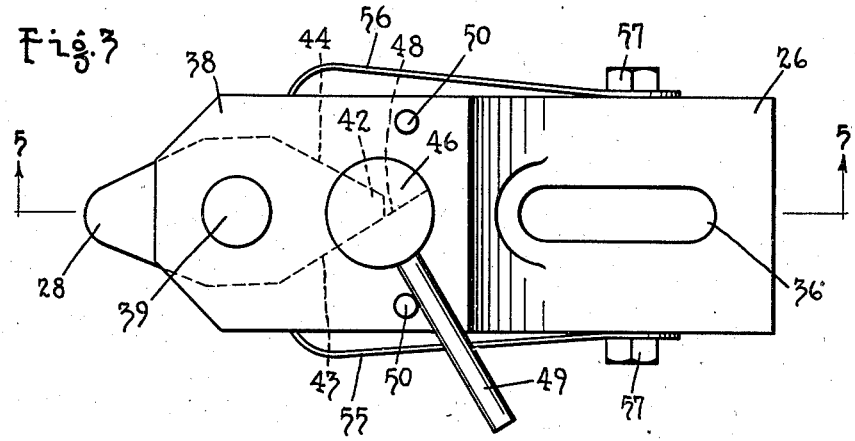
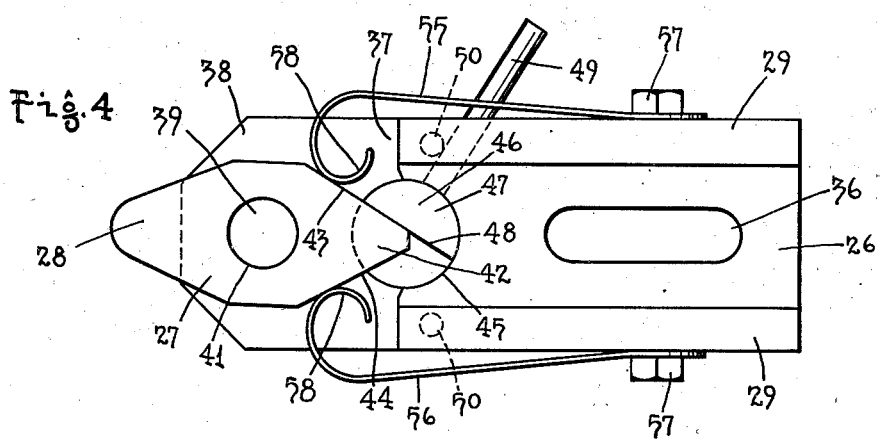
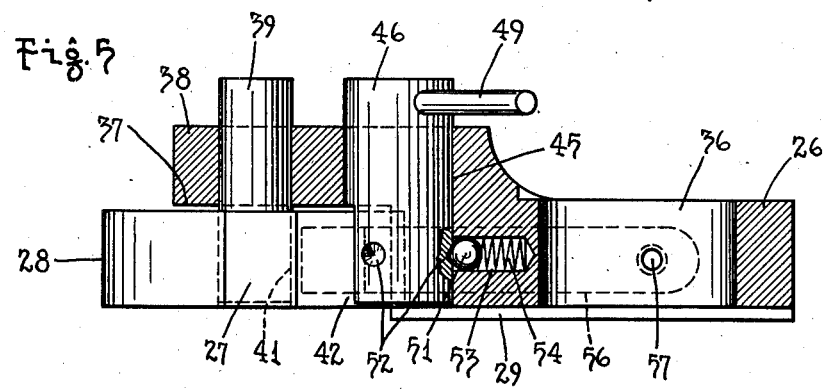
Inventor
Albert T. O'Neil Patented Jan. 14, 1947

2,414,387

UNITED STATES PATENT OFFICE 2,414,387

PIVOTED BENDER WITH PIVOTED WORK ENGAGING DOG

Albert T. O'Neil, Minneapolis, Minn.

Application February 17, 1945, Serial No. 578,453

9 Claims. (Cl. 153—45)

My invention relates to benders and particularly that type of bender in which a lever carrying a pivoted dog is rotated relative to a bed for bending stock about a mandrel mounted on the bed.

An object of the invention resides in providing an abutment for limiting the movement of the dog in one direction to procure bending of the stock when the lever is swung in one direction and to permit of disengagement of the dog from the stock when the lever is swung in the opposite direction.

Another object of the invention resides in providing a reversible abutment for limiting the movement of the dog about its pivot in either direction.

A still further object of the invention resides in constructing the dog with a tail having oppositely disposed faces and in supporting the abutment for movement to engage either of said faces.

A still further object of the invention resides in providing a shaft rotatable relative to said dog and in mounting said abutment on said shaft.

A feature of the invention resides in arranging the shaft with its axis parallel to the axis of the pivot of the dog and in constructing the abutment with a substantially diametral surface adapted to engage the faces of the dog.

A still further object of the invention resides in arranging the faces of the dog angularly with respect to one another so as to reduce the circular rotation of the shaft necessary to bring the abutment into engagement with either of the faces of the dog.

Other objects of the invention reside in the novel combination and arrangement of parts and in the details of construction hereinafter illustrated and/or described.

In the drawings:

Fig. 3 is a plan view of the dog-supporting block removed from the bender and drawn to a greater scale than Fig. 1.

Fig. 4 is an inverted view of the structure shown in Fig. 3.

Fig. 5 is an elevational sectional view taken on line 5—5 of Fig. 3.

In the use of benders where the stock is bent about a mandrel by means of a dog mounted on a lever and having a nose, roller or similar structure for engaging the stock, considerable pressure is required between the nose or roller and the stock during the bending operation. In returning the lever to normal position, it becomes desirable to release the pressure of the nose on the stock. This is accomplished by employing a pivoted dog adapted to swing toward and from the stock together with an abutment limiting the movement of the dog in one direction. When it becomes desirable to reverse the direction of movement of the lever, the dog must be restrained from movement in the opposite direction. The instant invention provides a construction whereby the abutment for engagement with the dog may be easily and quickly moved so that the bending lever may operate either in a clockwise or counter-clockwise direction with reference to the stock.

Figure 1:
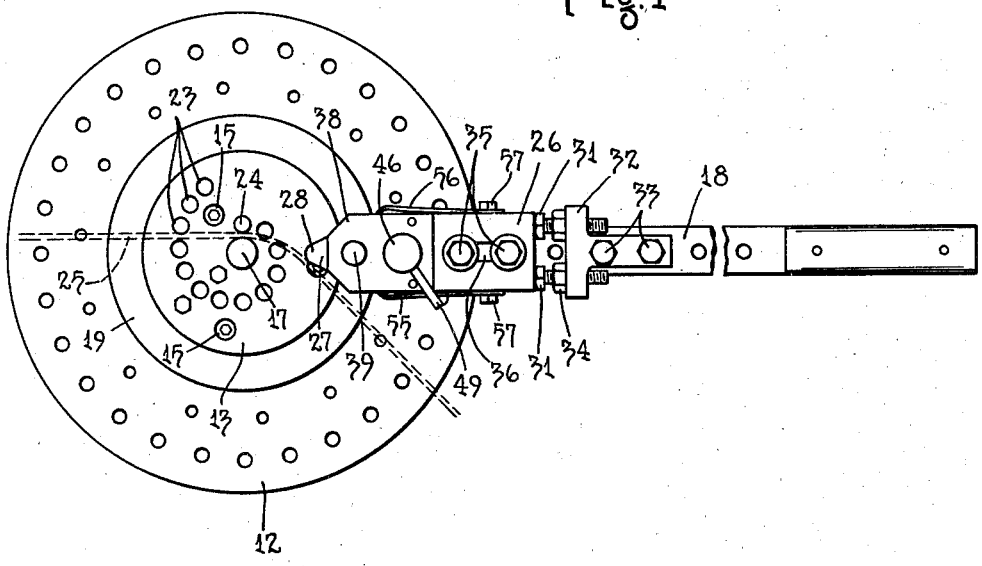
Fig. 1 is a plan view of a bender illustrating an embodiment of my invention.
Figure 2:
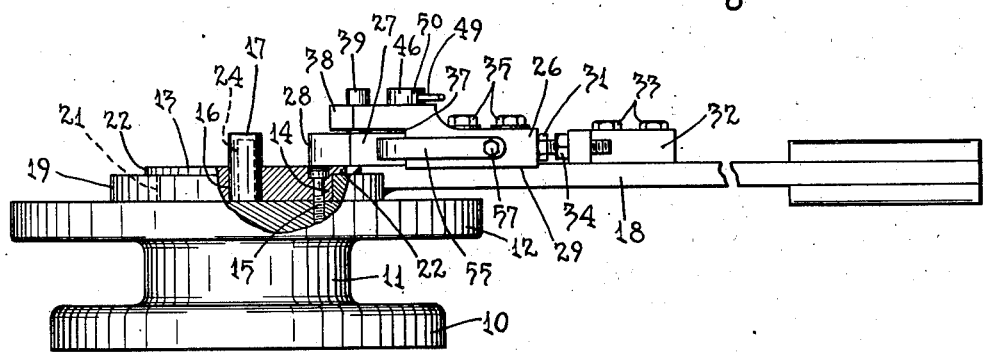
Fig. 2 is an elevational view of the structure shown in Fig. 1 with portions illustrated in section.

In Figs. 1 and 2, I have shown an ordinary bending machine which comprises a base 10 having a body portion 11 extending upwardly therefrom. Carried by this body portion is a table 12 upon which a bed 13 is mounted. The bed 13 has a stub staft 14 depending therefrom which overlies the table 12 and is secured thereto by means of cap screws 15 threaded into the table 12. The bed 13 has a central hole 16 formed in it concentric with the shaft 14 and in which a mandrel 17 may be mounted.

Rotatably mounted relative to the axis of the mandrel 17 is a lever 18. This lever has a ring shaped boss 19 which is rotatably mounted on the stub shaft 14 formed on the bed 13. The bed 13 has a flange 22 which overlies the boss 19 and holds the same in position upon the table 12. The bed 13 has formed in it a series of spirally arranged holes 23 in which a pin 24 may be inserted. This pin is disposed the proper distance from the mandrel 17 to receive the stock therebetween which is indicated in dotted lines at 25 in Fig. 1.

The lever 18 has adjustably mounted on it a block 26 which supports a dog 27 adapted to engage the stock. This dog has a nose 28 which serves as an engaging means for engaging the stock and bending the same about the mandrel 17. The block 26 has flanges 29 depending therefrom which are best shown in Figs. 4 and 5 and which are adapted to straddle the lever and guide the block for movement longitudinally with respect to said lever. Movement of the block 26 toward the mandrel 17 is accomplished by means of two screws 31, the heads of which engage said block. These screws are threaded into a bracket 32 attached to the lever 18 by means of cap screws 33. Lock nuts 34 hold these screws in adjusted position. The block 26 is clamped in position by means of two cap screws 35 which extend through a slot 36 in said block and are threaded into the lever 18.

The block 26 is formed with a rabbet 37 in the under side thereof and in which the dog 27 is mounted. This construction provides an overhanging portion 38 which is provided with a pin 39 extending into the rabbet 37. The dog 27 has a bore 41 which is rotatably mounted on the projecting portion of the pin 39. The dog 27, as previously mentioned, is formed with the nose 28 at its forward end which nose projects outwardly beyond the overhanging portion 38 of the block 26. Rearwardly of the nose 28, the dog 27 has a tail 42 which is constructed with two angularly disposed faces 43 and 44 best shown in Fig. 4. These faces converge in a direction away from the pin 39 on which the dog swings.

Formed in the block 26 rearwardly of the pin 39 is a bore 45 which is parallel with the axis of the pin 39. Rotatably mounted in this bore is a shaft 46 which extends into the rabbet 37. The portion of the shaft 46 within the rabbet 37 is formed to provide an abutment 47 which has a surface 48 adapted to engage the faces 43 and 44 of the dog 27. The face 48 of the abutment 47 is substantially diametral and the axis of the shaft 46 is substantially at the end of the tail 42 of dog 27. The shaft 46 projects upwardly above the overhanging portion 38 of block 26 and is provided at such locality with a finger piece 49 by means of which said shaft may be rotated. This finger piece operates between two stops 50 issuing outwardly from the block 26. It will readily be comprehended that when the shaft 46 is in the position shown in Figs. 3, 4 and 5, that the surface 48 of abutment 47 engages the face 43 of dog 27. In such position, the dog 27 may swing in a counter-clockwise direction, as viewed in Fig. 3, but is restrained from movement in the opposite direction. This permits of turning the lever 18 in a clockwise direction as viewed in Fig. 1. By slightly moving the dog 27 in a counter-clockwise direction, as viewed in Fig. 3, the face 43 of said dog may be disengaged from the abutment 47 and the shaft 46 rotated in a counter-clockwise direction as viewed in Fig. 3, to bring the surface 48 of the abutment 47 into engagement with face 44 of the dog 27. Dog 27 is now restrained from movement in the opposite direction and the lever 18 may be used for bending the stock about the mandrel 17 by rotating said lever in the opposite direction. The shaft 46 is held in its two extreme positions by means of a ball 51 which is adapted to engage either of two depressions 52 formed in shaft 46. This ball slides in a bore 53 in block 26 and is urged towards the shaft 46 by means of a coil spring 54 also disposed within the bore 53.

In order to urge the dog into engagement with the abutment 47, two leaf springs 55 and 56 are employed which are bolted to the sides of the block 26 by means of cap screws 57 screwed into said block. These springs have portions 58 which engage the faces 43 and 44 of the dog 27 and cause the same to respectively engage the surface 48 of the abutment 47 when the shaft 46 is in proper position.

In the use of the device, it merely becomes necessary to move the dog 27 by slightly rotating the same on the pin 39 to free the dog from the abutment 47. Finger piece 49 may now be engaged and the shaft 46 rotated throughout a sufficient angle to bring the surface 48 of abutment 47 into engagement with the opposite face of the dog. It thus becomes possible to form both right and left hand pieces on the bender without changing the mandrel or stops by rotating the handle 18 to either the position shown in Figs. 1 and 3 or to a position diametrically opposite thereto.

The advantages of my invention are manifest. With my invention, considerable time is saved in the reversal of the operation of the bender. With my invention, it becomes unnecessary to take the machine apart or to change the stops used in the bending of the stock. My invention can be constructed at small expense. The abutment used in connection with the pivoted dog of the invention can be constructed extremely sturdy so that sufficient pressure may be exerted to bend relatively heavy stock. My invention will not readily wear out and will function indefinitely without attention.

Changes in the specific form of my invention, as herein described, may be made within the scope of what is claimed without departing from the spirit of my invention.

Having described my invention, what I claim as new and desire to protect by Letters Patent is:

1. A bender for bending stock about a mandrel and comprising a support for the mandrel, a lever pivoted for swinging movement on a part carried by the support and about the axis of the mandrel as a center, a dog pivoted on a part carried by the lever for swinging movement relative to the lever, engaging means thereon for engagement with the stock and movable toward and away from the mandrel when the dog is swung, and an abutment pivoted on a part carried by the lever for swinging movement relative to the dog, said abutment in one position obstructing movement of the dog in one direction and clearing the dog when the dog is moved in the opposite direction.

2. A bender for bending stock about a mandrel and comprising a support for the mandrel, a lever pivoted for swinging movement on a part carried by the support and about the axis of the mandrel as a center, a dog pivoted on a part carried by the lever for swinging movement relative to the lever, engaging means thereon for engagement with the stock and movable toward and away from the mandrel when the dog is swung, an abutment pivoted on a part carried by the lever for swinging movement relative to the dog, said abutment in one position obstructing movement of the dog in one direction and clearing the dog when the dog is moved in the opposite direction, and said abutment when in another position obstructing movement of said dog in the second named direction and clearing the dog when the dog is moved in the first named direction.

3. A bender for bending stock about a mandrel and comprising a support for the mandrel, a lever pivoted for swinging movement on a part carried by the support and about the axis of the mandrel as a center, a dog pivoted on a part carried by the lever for swinging movement relative to the lever, engaging means thereon for engagement with the stock and movable toward and away from the mandrel when the dog is swung, a tail on said dog having angularly disposed faces and an abutment movably supported by a part mounted on said lever and movable into engagement with either of said faces.

4. A bender for bending stock about a mandrel and comprising a support for the mandrel, a lever pivoted for swinging movement on a part carried by the support and about the axis of the mandrel as a center, a dog pivoted on a part carried by the lever for swinging movement relative to the lever, engaging means thereon for engagement with the stock and movable toward and away from the mandrel when the dog is swung, oppositely facing faces on said dog, and an abutment movably supported by a part mounted on said lever and movable into engagement with either of said faces.

5. A bender for bending stock about a mandrel and comprising a support for the mandrel, a lever pivoted for swinging movement on a part carried by the support and about the axis of the mandrel as a center, a dog pivoted on a part carried by the lever for swinging movement relative to the lever, engaging means thereon for engagement with the stock and movable toward and away from the mandrel when the dog is swung, oppositely facing faces on said dog, a shaft supported for rotation relative to said dog by a part carried by said lever and an abutment on said shaft movable upon rotation of said shaft to either of two positions to engage either of said faces.

6. A bender for bending stock about a mandrel and comprising a support for the mandrel, a lever pivoted for swinging movement on a part carried by the support and about the axis of the mandrel as a center, a dog pivoted on a part carried by the lever for swinging movement relative to the lever, engaging means thereon for engagement with the stock and movable toward and away from the mandrel when the dog is swung, a tail on said dog having angularly disposed faces, a shaft supported for rotation relative to said dog by a part carried by said lever and an abutment on said shaft movable upon rotation of said shaft through an angle less than one hundred and eighty degrees upon rotation of said shaft to either of two positions to engage either of said faces.

7. A bender for bending stock about a mandrel and comprising a support for the mandrel, a lever pivoted for swinging movement on a part carried by the support and about the axis of the mandrel as a center, a dog pivoted on a part carried by the lever for swinging movement relative to the lever, engaging means thereon for engagement with the stock and movable toward and away from the mandrel when the dog is swung, oppositely facing faces on said dog, a shaft supported by a part carried by said lever for rotation about an axis parallel with the axis of said dog and an abutment on said shaft movable upon rotation of said shaft to either of two positions to engage either of said faces.

8. A bender for bending stock about a mandrel and comprising a support for the mandrel, a lever pivoted for swinging movement on a part carried by the support and about the axis of the mandrel as a center, a dog pivoted on a part carried by the lever for swinging movement relative to the lever, engaging means thereon for engagement with the stock and movable toward and away from the mandrel when the dog is swung, oppositely facing faces on said dog, a shaft supported by a part carried by said lever for rotation about an axis parallel with the axis of said dog and an abutment on said shaft having a substantially diametral surface adapted on rotation of said shaft to occupy either of two positions to engage either of said faces.

9. A bender for bending stock about a mandrel and comprising a support for the mandrel, a lever pivoted for swinging movement on a part carried by the support and about the axis of the mandrel as a center and movable in one direction from an initial position to form the stock about the mandrel and movable in the opposite direction back to its initial position, a dog pivoted on a part carried by the lever for swinging movement relative to the lever, engaging means on said dog for engagement with the stock and movable toward and away from the mandrel when the dog is swung, said engaging means being adapted to be urged against the stock during the forming movement of the lever and to be retracted therefrom during the return movement of the lever, and an abutment pivoted on a part carried by the lever for swinging movement relative to the dog, said abutment in one position obstructing movement of the dog when the lever is being moved to form the work and clearing the dog when the lever is moved in the opposite direction.

ALBERT T. O'NEIL.